(No Model.) 2 Sheets—Sheet 2.
L. PAYSSÉ & W. P. CAREY.
MOSQUITO BAR ATTACHMENT FOR BEDSTEADS.

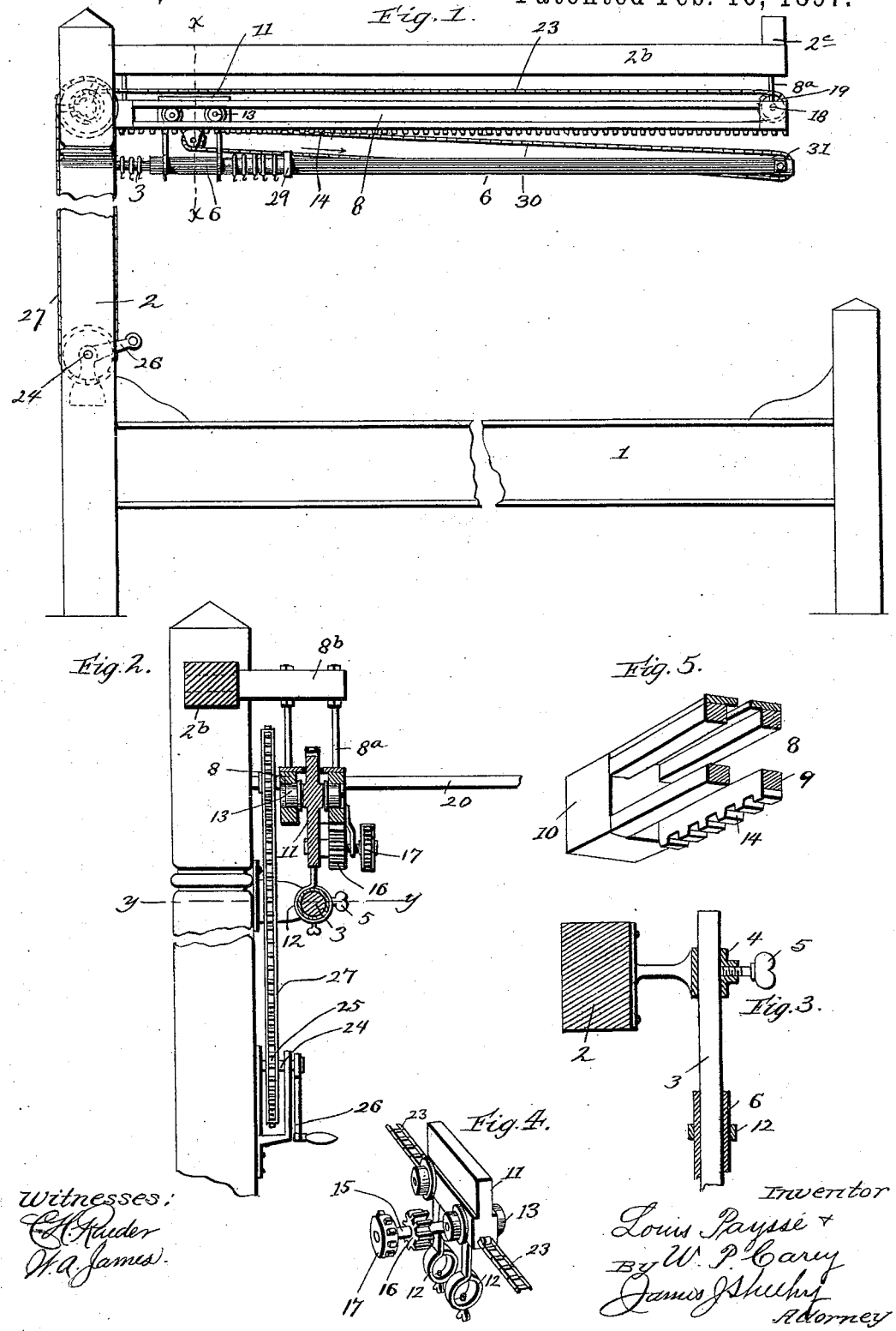

No. 577,318. Patented Feb. 16, 1897.

UNITED STATES PATENT OFFICE.

LOUIS PAYSSÉ AND WILLIAM P. CAREY, OF NEW ORLEANS, LOUISIANA.

MOSQUITO-BAR ATTACHMENT FOR BEDSTEADS.

SPECIFICATION forming part of Letters Patent No. 577,318, dated February 16, 1897.

Application filed August 26, 1896. Serial No. 604,006. (No model.)

*To all whom it may concern:*

Be it known that we, LOUIS PAYSSÉ and WILLIAM P. CAREY, citizens of the United States, residing at New Orleans, in the parish of Orleans and State of Louisiana, have invented certain new and useful Improvements in Mosquito-Bar Attachments for Bedsteads; and we do declare the following to be a full, clear, and exact description of the invention, such as will enable others skilled in the art to which it appertains to make and use the same.

Our invention relates to improvements in mosquito-bar attachments for bedsteads; and it has for its general object to provide such an attachment through the medium of which a person after getting in bed may move a mosquito-bar so that the same will entirely cover the bedstead and may also move the bar so as to uncover a portion of the bedstead and permit free and convenient egress from the same.

Other objects and advantages of the invention will be fully understood from the following description and claims when taken in conjunction with the annexed drawings, in which—

Figure 6:
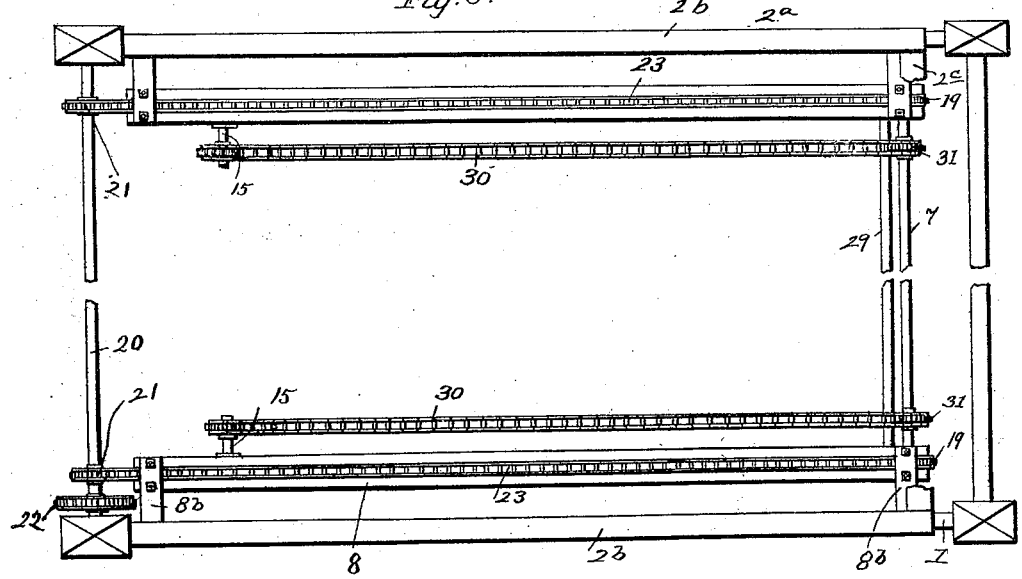
Figure 7:
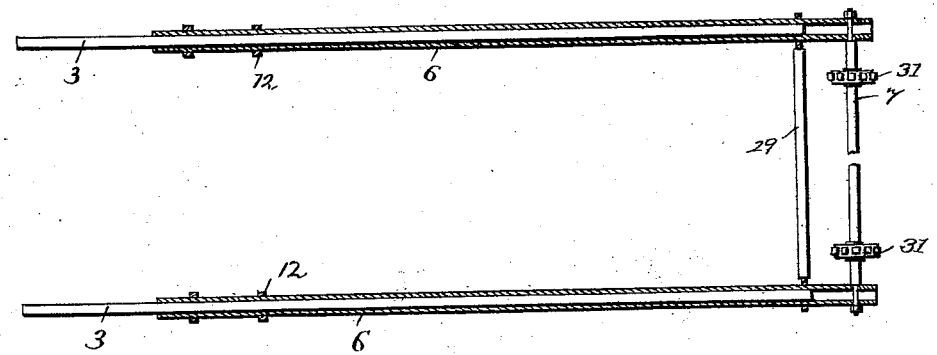

Figure 1 is a broken elevation showing our improved attachment in its operative position on a bedstead. Fig. 2 is a detail enlarged broken section taken in the plane indicated by the line $x\,x$ of Fig. 1. Fig. 3 is a detail section taken in the plane indicated by the line $y\,y$ of Fig. 2. Fig. 4 is a detail perspective view of one of the traveling carriers. Fig. 5 is a perspective section of one of the tracks for the traveling carriers. Fig. 6 is a general plan view with parts broken away, and Fig. 7 is a section taken through the horizontal supporting-rods and the movable sleeves thereon.

In the said drawings similar numerals designate corresponding parts in all of the several views, referring to which—

1 indicates a bedstead having the usual head-posts 2 and the frame $2^a$, comprising the side bars $2^b$, connected to said head-posts, and the forward cross-bar $2^c$, and 3 indicates horizontal rods, which are connected to the posts 2, preferably in a detachable and adjustable manner, by the sleeves 4 and the binding-screws 5, as better illustrated in Fig. 3. These rods 3 are designed and adapted to guide the movable sleeves 6, which are arranged and adapted to slide thereon and are connected at their forward ends by a shaft 7, as shown, so as to form a movable frame for a purpose presently described.

8 indicates horizontal tracks, which are fixedly connected by bolts $8^a$ to arms $8^b$, extending inwardly from the side bars of the frame $2^a$, and are arranged above the rods 3 and sleeves 6, as shown. These tracks 8 by preference respectively comprise four bars 9, which are connected together at their opposite ends by block 10, as shown, and are designed and adapted to support the traveling blocks or carriers 11, as shown.

The carriers 11 are provided with traveling wheels 13, which bear upon the lower bars of the tracks 8, and they are also provided with hangers 12, to which the sleeves 6 are connected, whereby it will be seen that the said sleeves 6 are suspended from the tracks 8, and when the carriers 11 are moved the sleeves 6 and the mosquito bar or netting thereon will be moved with the said carriers. To enable a person within the bed to conveniently move the carriers 11, and consequently the sleeves 6, we provide the mechanism better illustrated in Figs. 1 and 2 of the drawings. This mechanism comprises the transverse shaft 18, journaled in the ends of the tracks 8 and carrying sprocket-wheels 19, the shaft 20, journaled in the head-posts 2 and carrying sprocket-wheels 21 and the sprocket-wheel 22, and the chains 23, taking around the sprocket-wheels 19 and 21 and connected at their opposite ends to the ends of the carriers 11, the short shaft 24, journaled in the head-posts 2 below the shaft 20, and having a sprocket-wheel 25 and a crank 26, and a chain 27, connecting the sprocket-wheels 25 and 22, as shown. In virtue of this construction it will be seen that when the crank 26 is turned in one direction the chains 23 will be moved, and the carriers 11, together with the sleeves 6, will be moved in one direction, for instance toward the foot of the bed. When the crank 26 is turned in the opposite direction, the carriers 11 and the sleeves 6 will be moved in the direction opposite to that stated, or toward the head of the bed.

14 indicates racks formed on the inner lower bars of the tracks 8, and 15 indicates transverse shafts which are journaled in the carriers 11 and have pinions 16, engaging the racks 14, and also have sprocket-wheels 17 for a purpose presently described.

28 indicates rings which are loosely arranged on the sleeves 6 and are provided with hooks or other suitable means for the convenient connection of a mosquito-bar, (not illustrated,) and 29 indicates a cross-bar which is loosely mounted and designed to be moved upon the sleeves 6 and is also designed for the connection of the mosquito-bar. This bar 29 is connected to chains 30, which take around the sprocket-wheels 31 on the rod 7 and the sprocket-wheels 17 of the carriers 11, and it will therefore be seen that when the carriers and the sleeves 6 are moved toward the foot of the bed, as before described, the pinions 16, engaging the racks 14, will be rotated, as will also the shafts 15 and sprocket-wheels 17, and the chains 30 will be moved in the direction indicated by arrow to carry the cross-bar 29 and the mosquito-bar (not illustrated) connected thereto to the outer ends of the sleeves 6. Thus it will be observed that a person may conveniently get into bed and may then easily and quickly move the mosquito-bar so that the same will entirely cover the bedstead, and it will also be observed that when a person desires to leave the bed he can easily draw the mosquito-bar into a compact bundle at the head of the bedstead. The mosquito-bar may be and preferably is also drawn into a compact bundle at the head of the bed when the bed is to be made up, so as not to interfere with such operation.

Having described our invention, what we claim, and desire to secure by Letters Patent, is—

1. In a mosquito-bar attachment for bedsteads, the combination of a bedstead, the frame 2ª, connected thereto, the longitudinal rods connected to the head-posts of the bedstead, the movable sleeves arranged on the rods and connected at their forward ends by a cross-rod and adapted to carry a mosquito-bar, tracks connected with the frame 2ª, and arranged above the rods and movable sleeves, movable carriers arranged on the tracks and having hangers connected to the movable sleeves, a crank arranged at the head of the bedstead, and mechanism connected with and designed to be actuated by the crank for moving the carriers, substantially as and for the purpose set forth.

2. In a mosquito-bar attachment for bedsteads, the combination of a bedstead, the frame 2ª, connected thereto, the longitudinal rods connected to the head-posts of the bedstead, the movable sleeves arranged on the rods and connected at their forward ends by a cross-rod and adapted to carry a mosquito-bar, tracks connected with the frame 2ª, and arranged above the rods and movable sleeves, shafts journaled in the carriers and having pinions engaging the racks of the tracks and also having sprocket-wheels, a shaft arranged in the tracks and having sprocket-wheels, a shaft journaled in the head-posts and having three sprocket-wheels, chains taking around the sprocket-wheels of said shafts and connected at their opposite ends to the carriers, a crank-shaft arranged within convenient reach of a person in bed, gearing connecting said crank-shaft and the shaft arranged in the head-posts of the bedstead, sprocket-wheels mounted on the cross-rod at the forward ends of the movable sleeves, sprocket-chains taking around said sprocket-wheels and the sprocket-wheels on the shafts journaled in the carriers, and a cross-bar movable on the movable sleeves and connected to the said chains, substantially as and for the purpose set forth.

3. In a mosquito-bar attachment for bedsteads, the combination of a bedstead, the frame 2ª, connected thereto, the longitudinal rods connected with the head-posts of the bedstead, the movable sleeves arranged on the rods and connected at their forward ends by a cross-rod and adapted to carry a mosquito-bar, tracks connected with the frame 2ª, and arranged above the rods and movable sleeves and having racks, movable carriers arranged on the tracks and having hangers connected to the movable sleeves, shafts journaled in the carriers and having pinions engaging the racks of the tracks and also having sprocket-wheels, sprocket-wheels mounted on the cross-rod at the forward ends of the movable sleeves, sprocket-chains taking around said sprocket-wheels and the sprocket-wheels on the shafts journaled in the carriers, a cross-bar movable on the movable sleeves and connected to the said chains and adapted for the connection of a mosquito-bar, and means for moving the carriers, substantially as specified.

In testimony whereof we affix our signatures in presence of two witnesses.

LOUIS PAYSSÉ.
WILLIAM P. CAREY.

Witnesses:
SIDNEY ROBINSON,
HENRY MAILLER.